(No Model.)
R. SCHEIBEL.
ANIMAL TRAP.
No. 530,723. Patented Dec. 11, 1894.
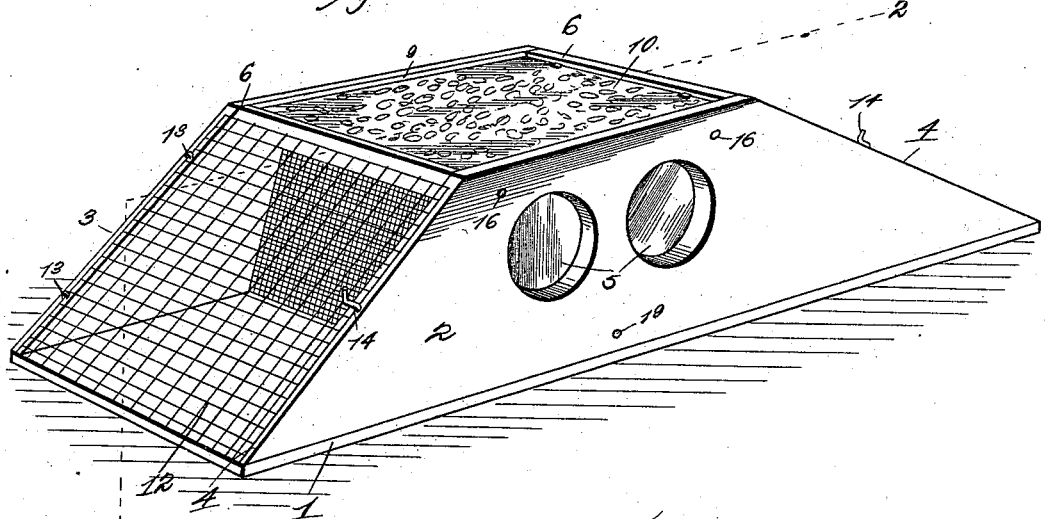
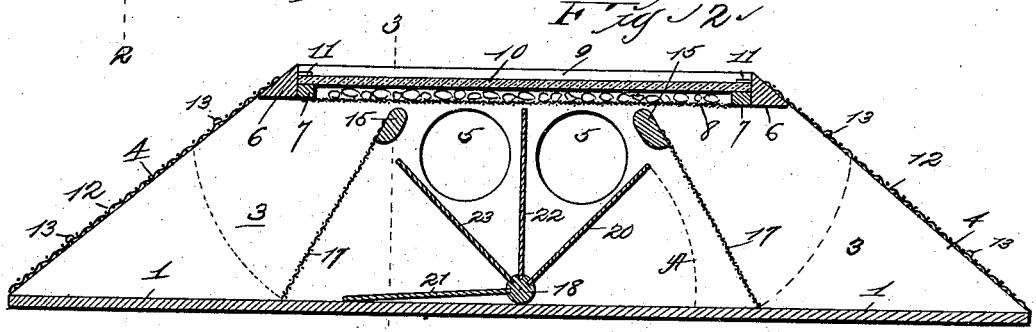
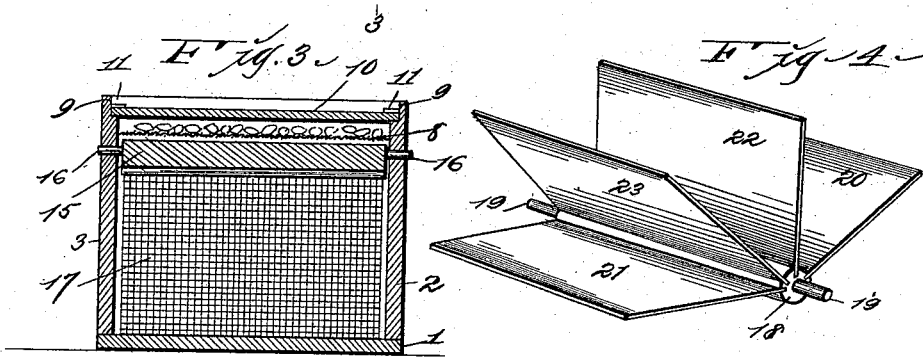
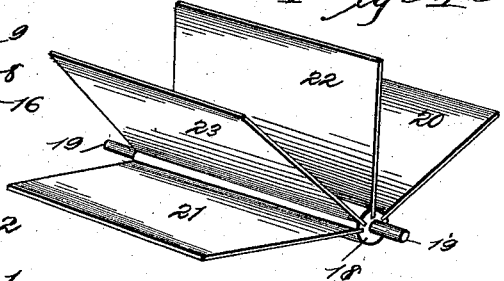
Attest:
M. P. Smith
Maud Griffin
Inventor:
Richard Scheibel
By Higdon & Higdon & Longan
Attys.

UNITED STATES PATENT OFFICE.

RICHARD SCHEIBEL, OF ST. LOUIS, MISSOURI, ASSIGNOR OF ONE-HALF TO PETER M. KING, OF SAME PLACE.

ANIMAL-TRAP.

SPECIFICATION forming part of Letters Patent No. 530,723, dated December 11, 1894.

Application filed July 30, 1894. Serial No. 518,935. (No model.)

*To all whom it may concern:*

Be it known that I, RICHARD SCHEIBEL, of the city of St. Louis, State of Missouri, have invented certain new and useful Improvements in Traps, of which the following is a full, clear, and exact description, reference being had to the accompanying drawings, forming a part hereof.

My invention relates to animal traps of that class which employ an oscillating platform or platforms, and swinging doors, the object of my invention being to construct an animal trap that will be always set and ready for use, and where the bait may be seen and scented by the animals for which the trap is set.

A further object of my invention is the providing of means, whereby the bait of the trap is so held and positioned that whenever the animal may see and scent said bait, access thereto by the animal is prevented.

A further object of my invention is to construct an animal trap that will possess superior advantages in point of simplicity, durability and general efficiency.

In order that my invention may be more fully understood, I will now proceed to describe it, reference being had to the accompanying drawings, in which—

Figure 1 is a view in perspective of my complete trap. Fig. 2 is a longitudinal sectional view on the line 2—2 of Fig. 1. Fig. 3 is a vertical cross-sectional view on the line 3—3 of Fig. 2. Fig. 4 is a view in perspective of a series of oscillating and tilting platforms and doors I make use of in carrying out my invention.

Referring by numerals to the accompanying drawings, 1 designates the base of my improved animal trap, said base being preferably made of a rectangular piece of wood or metal, and has secured to it in any suitable manner the vertical sides 2 and 3. The ends of these sides 2 and 3 are inclined, as indicated by the numeral 4, and oppositely arranged in said sides are circular apertures or passages 5. Triangular cross-bars 6 are secured to the top edges of the sides 2 and 3, and have secured to their inner sides rectangular bars 7. To the under side of these rectangular bars 7, and extending from one side to the other, is a section of reticulated material or wire mesh 8. Positioned directly upon the rectangular bars 7 and in the off-sets 9 formed in the top edges of the sides 2 and 3, is a section of transparent material, preferably glass, 10, the same being held in position by means of pins or ordinary glass fasteners 11. The inclined ends of the trap so constructed are provided with the swinging reticulated doors 12, the same being hinged by means of ordinary staples 13 and normally locked and held in position by wire catches 14.

Rotating bars 15 are provided with bearings 16 upon their ends, said bearings passing through the sides 2 and 3 immediately beneath the reticulated section 8, and have secured thereto in any suitable manner rectangular sections of reticulated material 17, the same being adapted to entirely close the space between the base 1, the reticulated section 8, and the sides 2 and 3. These rotating bars 15 extend from one wall to the other at a point between the openings 5 and the triangular crossbar 6. The reticulated sections 17 are of such a length as to strike the base 1 at a point directly beneath the cross-bars 6 so as to incline said reticulated sections 17. These rotating cross-bars carrying the reticulated sections constitute the swinging doors of my improved trap.

Extending from one side to the other, and immediately above the base 1 and in the longitudinal center of the trap, is a shaft 18 having thereon the journals 19 adapted to be positioned within the sides 2 and 3 of the trap. Radiating from this shaft 18 is a pair of platforms 20 and 21, between which and radiating from the shaft 18, are interposed cut-off doors 22 and 23. These platforms and doors are so arranged as that when the platform 21 contacts with the base 1, the cut-off door 22 will act as a cut-off between the apertures or passages 5, and the platform 20 positioned or set for the entering of an animal to the interior of the trap.

The operation is as follows: Premising that the parts of the trap are in the position as shown in Fig. 2, an animal on entering the aperture 5 to the right will pass under the platform 20, and, by reason of its weight, said animal will rotate the shaft 18, thereby causing the platform 20 to move in the direction of the dotted lines "A," thus precipitating said animal to the base 1 of the trap, and immediately in front of the swinging door formed by the bar 15 and reticulated section 17. As the cut-off or door 22 prevents the exit of said animal through the aperture 5, it will instinctively turn and pass toward the light, or, to the right hand of the trap. In so doing, said animal will contact and raise the swinging door formed by the cross-bar 15 and reticulated section 17, and pass to the chamber between said swinging door and the reticulated end 12 upon the right hand end of the trap. Here the animal will be imprisoned until disposed of. An animal in thus passing into the trap raises the platform 21 to a point immediately beneath the left hand apertures 5, thus resetting the trap for the capture of another animal.

The plate 10 being of transparent material, such as glass, the bait can be readily seen by the animals, and, by reason of locating said bait upon the reticulated section 8, it may be easily scented by the animals.

If desired, the entire frame work of my improved trap may be constructed of tin, sheet metal, &c., which will effectually prevent the imprisoned animals from gnawing an escape from said trap. The trap may be made of various sizes for different sized animals, and for different animals various kinds of bait must necessarily be used.

I have found in practice that for the capture of rodents and small animals inhabiting dwellings, barns, &c., grains of wheat, corn, small portions of bread, crackers, and cheese form a suitable bait.

Thus it will be seen how I have constructed a simple, durable, and inexpensive animal trap, one that is always set and ready for use, and one in which the bait is plainly visible and readily scented by the animals, said bait being so located and held as to be inaccessible to the animals.

What I claim is—

1. In an animal trap, a bait receptacle located in the top of said trap, said bait receptacle comprising a section of reticulated material, and a plate of transparent material, such as glass, positioned above said reticulated material.

2. In an animal trap, the combination of a rectangular frame work having inclined ends, reticulated doors covering said inclined ends, reticulated swinging doors positioned across the interior of said frame work, and a series of tilting platforms and cut-off doors radiating from the central shaft, said shaft being journaled in the sides of the frame work.

In testimony whereof I affix my signature in presence of two witnesses.

RICHARD SCHEIBEL.

Witnesses:
E. E. LONGAN,
JNO. C. HIGDON.